US008687203B2

(12) United States Patent
Doerband (10) Patent No.: US 8,687,203 B2
(45) Date of Patent: Apr. 1, 2014

(54) METHOD AND APPARATUS FOR DETERMINING A SHAPE OF AN OPTICAL TEST SURFACE

(75) Inventor: Bernd Doerband, Aalen (DE)

(73) Assignee: Carl Zeiss SMT GmbH, Oberkochen (DE)

( * ) Notice: Subject to any disclaimer, the term of this patent is extended or adjusted under 35 U.S.C. 154(b) by 135 days.

(21) Appl. No.: 13/399,716

(22) Filed: Feb. 17, 2012

(65) Prior Publication Data

US 2012/0236316 A1 Sep. 20, 2012

(51) Int. Cl.
*G01B 11/02* (2006.01)

(52) U.S. Cl.
USPC .......................................... 356/513

(58) Field of Classification Search
USPC .................. 356/495, 489, 512–516
See application file for complete search history.

(56) References Cited

U.S. PATENT DOCUMENTS

| 8,269,981 | B1 | 9/2012 | Doerband et al. |
| 2009/0079992 | A1 | 3/2009 | Doerband |
| 2009/0128829 | A1 | 5/2009 | Schillke et al. |
| 2011/0242545 | A1* | 10/2011 | Tomimizu et al. ............ 356/513 |

FOREIGN PATENT DOCUMENTS

DE   10 2008 048 844 A1   5/2009

OTHER PUBLICATIONS

M. Novak et al.,: "Distortion Mapping Correction in Aspheric Null Testing"; Proc. of SPIE vol. 7063, (2008) pp. 706313-1-706313-8.

* cited by examiner

*Primary Examiner* — Hwa Lee
(74) *Attorney, Agent, or Firm* — Sughrue Mion, PLLC (57) ABSTRACT

A method of determining a shape of an optical test surface (14) includes: with adaptation optics (20), adapting a wavefront of a measuring beam (30) to a desired shape of the optical test surface (14), interferometrically measuring the shape of the optical test surface (14) with the adapted measuring beam, irradiating the adapted measuring beam at different angles of incidence onto the optical test surface and respectively measuring the wavefront of the measuring beam after the interaction of the measuring beam with the optical test surface (14), establishing the effect of the adaptation optics (20) upon the interferometric measurement result from the wavefronts measured for the individual angles of incidence, and determining the shape of the optical test surface (14) by removing the established effect of the adaptation optics (20) from the interferometric measurement result.

11 Claims, 4 Drawing Sheets

METHOD AND APPARATUS FOR DETERMINING A SHAPE OF AN OPTICAL TEST SURFACE

This application claims priority to the German Patent Application No. 10 2011 004 376.4 filed on Feb. 18, 2011. The entire disclosure of this patent application is incorporated into the present application by reference.

BACKGROUND TO THE INVENTION

The invention relates to a method and an apparatus for determining a shape of an optical test surface.

The shape of high-precision optical free form surfaces, the deviation of which from rotational symmetry clearly exceeds the dynamics of a conventional interferometer, is measured using a so-called compensation system (C system). Such a compensation system, also referred to in the following as adaptation optics, is configured to form from an incoming wave having, for example, a plane or spherical wavefront, a wave the wavefront of which is identical to the desired shape of the free form surface to be measured. In many cases a computer-generated hologram (CGH) or a combination of a number of CGHs is used as adaptation optics.

In the case where adaptation optics consisting of two CGHs are used, partial calibration of the adaptation optics using a spherical calibrating mirror is possible as described in US 2009/0128829 A1. Unknown deviations remain however.

Rotationally symmetrical spheres are measured with great precision using rotation averaging. Rotation averaging is understood as meaning the recording and processing of a series of measurements each with different rotational positions of the specimen. The rotation averaging enables one to separate asymmetrical specimen and system errors of the adaptation optics. Rotationally symmetrical errors can not be separated and must be assessed by a complex theoretical budget consideration. The rotation averaging brings about, furthermore, averaging of shortwave errors which arise due to small deviations in the interferometer beam path as a result of non-perfect interferometer components. With free form surfaces it is not possible to implement the rotation averaging due to the lack of rotational symmetry. Due to this both the rotationally symmetrical and the asymmetrical errors of the adaptation optics remain undetermined and must be assessed by budget consideration. Furthermore, the averaging of shortwave errors produced in the interferometer is dispensed with.

UNDERLYING OBJECT

It is an object of the invention to provide a method and an apparatus with which the aforementioned problems are resolved and which, in particular, makes it possible to separate the errors of the optical test surface and the adaptation optics.

SOLUTION ACCORDING TO THE INVENTION

The aforementioned object is achieved according to the invention by a method of determining a shape of an optical test surface wherein a wavefront of a measuring beam is adapted to a desired shape of the optical test surface by means of adaptation optics, and the shape of the optical test surface is measured interferometrically by means of the adapted measuring beam. Furthermore, the adapted measuring beam is irradiated at different angles of incidence onto the optical test surface, and the wavefront of the measuring beam is measured respectively after the interaction of the latter with the optical test surface, i.e. for each of the different angles of incidence. Furthermore, the effect of the adaptation optics upon the interferometric measurement result from the wavefronts measured for the individual angles of incidence is established, and the shape of the optical test surface is determined by removing the established effect of the adaptation optics from the interferometric measurement result.

The optically effective surface of an optical element, such as for example a mirror or a lens, is called an optical test surface. Preferably the measurement of the wavefront of the measuring beam is taken after the measuring beam has interacted once again with the adaptation optics following interaction with the optical test surface.

In other words, it is the basic idea of the invention to measure the system comprising the adaptation optics and the optical test surface at different field angles. Whereas in regular interferometry the test rays fall vertically onto the test surface, in the method according to the invention measurements are taken at different angles of incidence. At different angles of incidence the test rays pass through the individual surfaces in laterally different positions. Lateral shearing of the individual contributions of the wavefront originating from the components occurs.

By taking measurements in accordance with the invention at different angles of incidence the contributions of individual optical surfaces involved to the overall wavefront may be separated. Separation of the errors of the optical test surface and the adaptation optics is thus possible. Furthermore, shortwave interferometer errors can be averaged.

According to one embodiment according to the invention, by means of an optical branch-off device a reference beam is branched off from the measuring beam. The effect of the branch-off device upon the interferometric measurement result is established from the wavefronts measured for the individual angles of incidence, and while determining the shape of the optical test surface the established effect of the branch-off device is removed from the interferometric measurement result.

According to a further embodiment according to the invention the measurement of the wavefronts of the measuring beam is implemented by evaluating interference patterns recorded by means of a detector camera. Individual rays of the measuring beam are assigned to individual measuring points on the detector camera. Furthermore, by means of ray tracing simulated coordinates of break-through points of the individual rays are provided in relation to at least one optical surface of the adaptation optics as a function of the angle of incidence, and while establishing the effect of the adaptation optics upon the interferometric measurement result the coordinates of the break-through points are taken into account. Within this context an optical surface of the adaptation optics is understood to mean every surface which changes the wavefront of a wave interacting with the adaptation optics, such as e.g. a surface of a CGH having a diffractive structure. The ray tracing preferably takes place on the system comprising the interferometer, adaptation optics and optical test surface in the desired state.

According to a further embodiment according to the invention the wavefront is simulated as a function of the angle of incidence by ray tracing, a contribution of at least one optical surface of the adaptation optics to the wavefront taken into account during the simulation thereby being varied, and by comparing the simulation results with the measured wavefronts the contribution of the at least one optical surface being determined. Furthermore, the contribution established is used when establishing the effect of the adaptation optics upon the interferometric measurement result.

According to a further embodiment according to the invention the desired shape of the optical test surface is a free form surface. Within this context a free form surface is understood as meaning a surface that has no rotational symmetry. In particular, the free form surface has on at least one point of the surface a deviation of at least 5 μm from each rotationally symmetrical surface. In other words, the free form surface can be described by a surface which differs from every rotationally symmetrical surface in that it deviates at least one point by at least 5 μm from the latter.

According to a further embodiment according to the invention, upon irradiating the adapted measuring beam the angle of incidence on the optical test surface is varied two-dimensionally. A two-dimensional variation of the angle of incidence is understood to mean that the beam direction of the measuring beam is varied by tilting in relation to two tilt axes not corresponding to the normal on the optical test surface.

According to a further embodiment according to the invention the optical test surface is formed by an optical element for microlithography. In particular, the optical element serves as part of a projection exposure tool for microlithography, e.g. as part of a projection objective or an illumination system of such a tool. According to a further embodiment according to the invention the optical element is configured as an EUV mirror.

According to a further embodiment according to the invention the adaptation optics comprise a diffractive optical element, in particular a CGH.

Furthermore, according to the invention an apparatus for determining a shape of an optical test surface is provided. This apparatus comprises adaptation optics for adapting a wavefront of a measuring beam to a desired shape of the optical test surface. The apparatus is configured to measure the shape of the optical test surface interferometrically. The apparatus according to the invention further comprises an angle of incidence varying device for irradiating the adapted measuring beam at different angles of incidence onto the optical test surface, and an evaluation device. The evaluation device is configured to establish the effect of the adaptation optics upon the interferometric measurement result from wavefronts of the measuring beam measured for different angles of incidence after the interaction of the latter with the optical test surface and to determine the shape of the optical test surface by removing the established effect of the adaptation optics from the interferometric measurement result.

According to one embodiment of the apparatus according to the invention the angle of incidence varying device comprises an adjustable deflection mirror. By means of the deflection mirror the adapted measuring beam can be irradiated onto the optical test surface at different angles of incidence.

According to a further embodiment according to the invention the angle of incidence varying device comprises a deflection mirror and a measuring beam generation device configured to irradiate the measuring beam onto the deflection mirror from several different positions shifted relative to each other laterally with respect to the propagation direction of the measuring beam. According to one variation the measuring beam generation device comprises an outlet opening for emitting the measuring beam and a translation device configured to move the outlet opening laterally with respect to the propagation direction of the measuring beam. The measuring beam generation device may comprise a flexible waveguide, especially an optical fiber, having the outlet opening arranged at an end of the waveguide. According to another variation the measuring beam generation device comprises several radiation sources arranged laterally displaced to each other.

According to a further embodiment according to the invention the angle of incidence varying device comprises at least one refractive element. According to another embodiment the angle of incidence varying device comprises at least one reflective element next to the deflection mirror.

According to a further embodiment according to the invention the adaptation optics comprise two diffractive structures configured such that by interaction of the measuring beam with the adaptation optics a reference beam and an object beam are generated, wherein the object beam has a wavefront adapted to the desired shape of the optical test surface. The reference beam may have a wavefront adapted to a reference surface of a reflective reference element, e.g. the wavefront of the reference beam may be spherical for reflection at a spherical Fizeau lens. According to a variation the adaptation optics comprise two diffractive optical elements, e.g. in form of computer generated holograms, arranged consecutively in the beam path of the measuring beam. According to another variation the adaptation optics may comprise a double coded diffractive optical element, such as a double coded computer generated hologram.

According to a further embodiment the apparatus according to the invention is configured to implement the method according to any of the embodiments listed above.

The features specified with regard to the embodiments listed above of the method according to the invention can be applied correspondingly to the apparatus according to the invention. Conversely, the features specified with regard to the embodiments listed above of the apparatus according to the invention can be applied correspondingly to the method according to the invention. These and other features of embodiments of the invention are described in the claims as well as in the specification and the drawings. The individual features may be implemented either alone or in combination as embodiments of the invention, or may be implemented in other fields of application. Further, they may represent advantageous embodiments, that are protectable in their own right, for which protection is claimed during pendency of this application and/or continuing applications.

BRIEF DESCRIPTION OF THE DRAWINGS

The above and further advantageous features of the invention are illustrated in the following detailed description of exemplary embodiments according to the invention with reference to the attached diagrammatic drawings. These show as follows.

DETAILED DESCRIPTION OF EXEMPLARY EMBODIMENTS ACCORDING TO THE INVENTION

In the exemplary embodiments described below, elements which are similar to one another functionally or structurally are provided as far as possible with the same or similar reference numbers. Therefore, in order to understand the features of the individual elements of a specific exemplary embodiment one should refer to the description of other exemplary embodiments or the general description of the invention.

Figure 1:
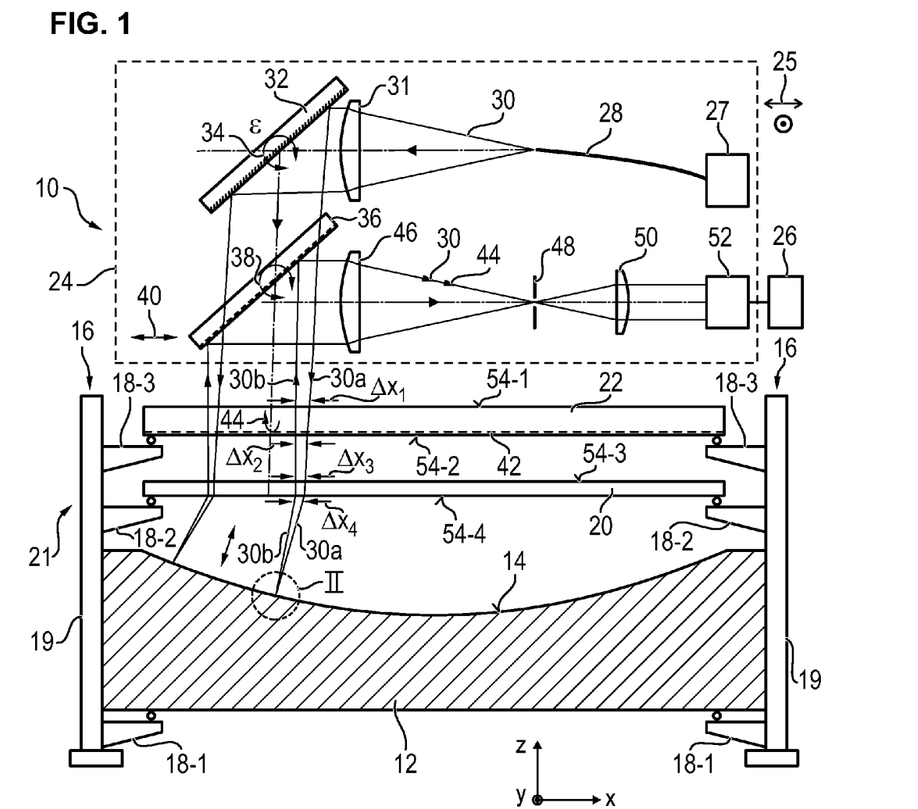
FIG. 1 a diagrammatic sectional view of an embodiment according to the invention of an apparatus for determining a shape of an optical surface by irradiating a measuring beam at different angles of incidence onto the optical surface, which apparatus comprises an interferometer unit and a cavity unit FIG. 2 an enlarged sectional view of the optical surface according to FIG. 1, in which the reflection of the incoming measuring beam at an angle of incidence ϵ is illustrated, FIG. 3 a diagrammatic sectional view of a further embodiment according to the invention of an apparatus for determining a shape of an optical surface having a different embodiment of an interferometer unit as compared to the embodiment according to FIG. 1, FIG. 4 a diagrammatic sectional view of a further embodiment according to the invention of an apparatus for determining a shape of an optical surface having a different embodiment of an interferometer unit as compared to the embodiment according to FIG. 3, FIG. 5 a diagrammatic sectional view of a further embodiment of a cavity unit according to the invention for use in an apparatus according to any one of FIGS. 1, 3 and 4, and FIG. 6 a diagrammatic sectional view of a further embodiment of a cavity unit according to the invention for use in an apparatus according to any one of FIGS. 1, 3 and 4.

In order to facilitate the description of the projection exposure tool, in the drawing a Cartesian xyz coordinate system is specified which shows the respective relative position of the components shown in the figures. In FIG. 1 the y direction extends perpendicularly from the plane of the drawing, the x direction to the right, and the z direction downwards.

FIG. 1 shows an embodiment according to the invention of an apparatus 10 for determining a shape of an optical test surface 14 in the form of the reflective surface of an optical element 12 reflecting radiation in the extreme ultraviolet (EUV) wavelength range. The optical test surface 14 is configured as a so-called free form surface, i.e. it has no rotational symmetry, and in particular it has at least one point a deviation of at least 5 μm from each rotationally symmetrical surface. In other words, the free form surface can be described by a surface which differs from every rotationally symmetrical surface in that it deviates from the latter at least one point by at least 5 μm. The optical element 12 measured by means of the apparatus 10 can be, for example, a mirror of a projection exposure tool for microlithography, in particular a mirror of a projection objective or of an illumination system of such a tool.

The apparatus 10 comprises an interferometer unit 24, a cavity unit 21 and an evaluation device 26. The cavity unit 21 comprises a Fizeau plate 22, a compensation system (C system) in the form of a diffractive optical element 20, and a holding device 16. The holding device 16 serves to hold the optical element 12 to be measured, the diffractive optical element 20 and the Fizeau plate 22 such that the aforementioned components form a rigid cavity. For this purpose the holding device 16 comprises a number of holding columns 19 of which element holders 18-1, 18-2 and 18-3 respectively project in order to support the optical element 12 to be measured, the diffractive optical element 20 and the Fizeau plate 22. The elements in the cavity unit 21 may be exchanged after measurement, such that other optical elements to be measured and corresponding diffractive optical elements may be inserted into the holding device 16 subsequently.

The interferometer unit 24 comprises a radiation source 27 for generating measuring radiation with a coherence sufficient to take an interferometric measurement. The measuring radiation can be in the visible or non-visible wavelength range. For example, the measuring radiation can be the light of a helium neon laser with a wavelength of approximately 633 nm. There is attached to the radiation source 27 a wave guide 28 in the form of an optical fibre from the end of which the measuring radiation exits initially in the form of a divergent measuring beam 30. The measuring beam 30 first of all passes through a collimator 31, by means of which said measuring beam is converted into a parallel bundle of rays. The measuring beam 30 is then deflected by an adjustable deflection mirror 32 in the direction of a cavity formed from the Fizeau plate 22, the diffractive optical element 20 and the optical element 12 to be measured.

After reflection on the deflection mirror 32 the measuring beam 30 passes through an adjustable splitter mirror 36 and then strikes the Fizeau plate 22 which has on its lower side a Fizeau surface 42 on which part of the intensity of the incoming measuring beam 30 is reflected and forms a reference beam 44. The non-reflected part of the measuring beam 30 passes through the diffractive optical element 20 which is in the form of a computer-generated hologram (CGH) and serves as adaptation optics. For this purpose the diffractive optical element 20 is configured such that the wavefront of the measuring beam 30 is adapted to the desired shape of the optical test surface 14 which—as mentioned above—is configured as a free form surface without rotational symmetry. The adjustable deflection mirror 32 is set up here such that the measuring beam strikes the optical test surface 14 perpendicularly. The adaptation optics can also be configured differently, for example they can also be formed by two diffractive elements in the form of CGHs arranged one after the other.

After reflection of the measuring beam 30 on the optical test surface 14, the latter passes once again through the diffractive optical element 20, the Fizeau plate 22, and is then reflected together with the reference beam 44 by the adjustable splitter mirror 36 into a detection arm of the interferometer unit 24. The detection arm comprises a collimator 46, an aperture 48, an ocular 50 and a camera 52 in the form of a two-dimensionally resolving radiation detector. By overlaying on the camera 52, the measuring beam 30 and the reference beam 44 generate an interferogram from which the deviation of the optical measuring surface 14 measured from its desired form is established. Since the desired shape of the optical test surface 14 is known, the actual shape of the optical test surface 14 is derived from the established deviation.

Figure 3:
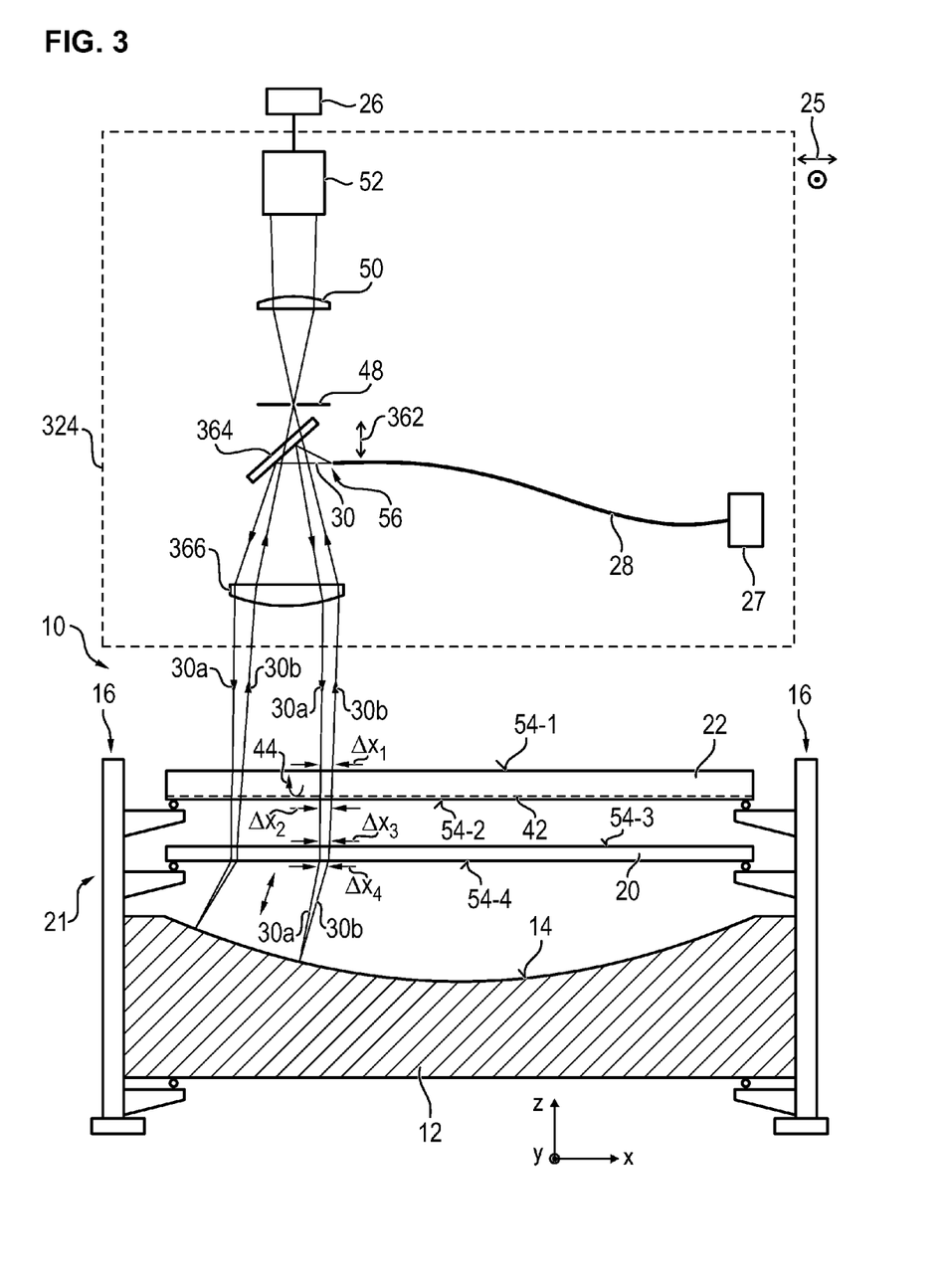
Figure 4:
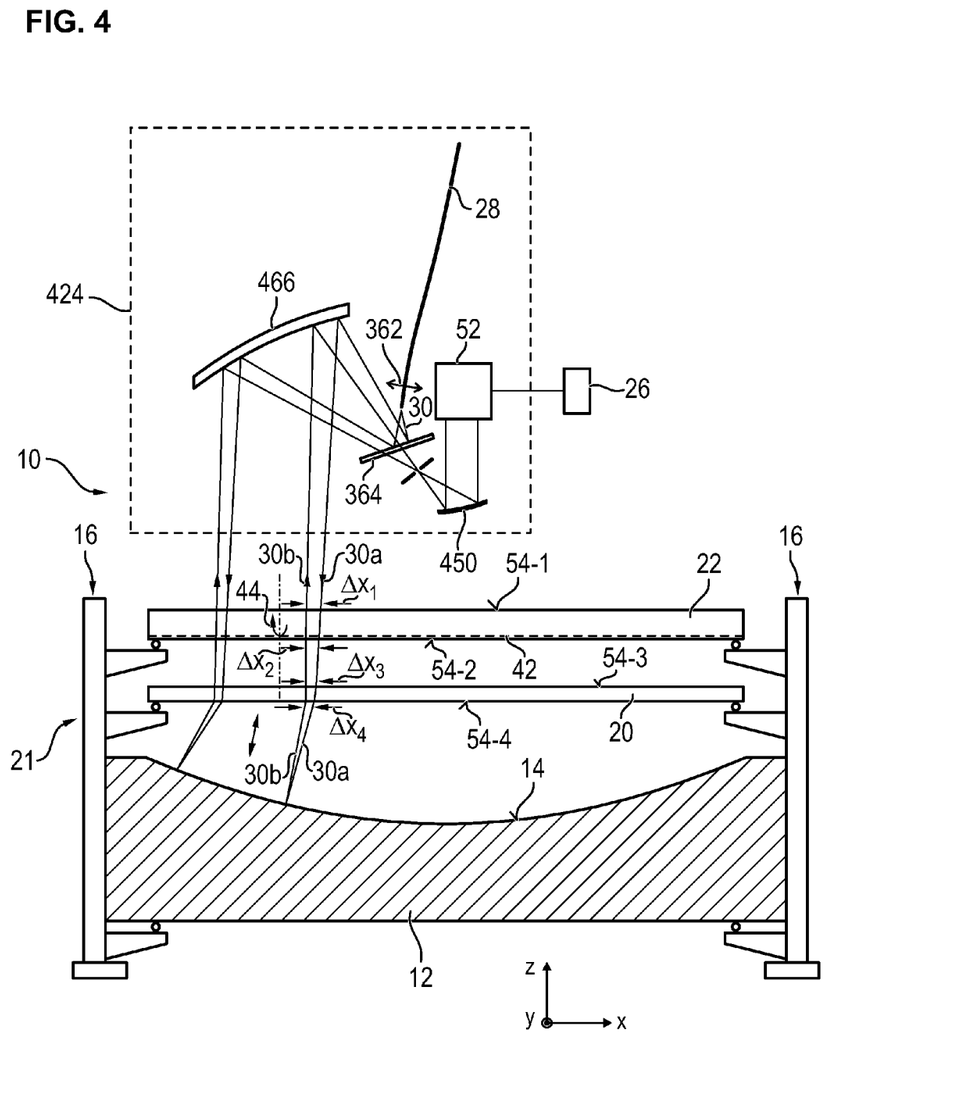

The interferometer unit 24 shown in FIG. 1, as well as interferometer units described subsequently with respect to FIGS. 3 and 4, are designed as so-called subaperture-measuring stitching interferometers. In this embodiment the measuring beam only covers a partial region of the optical test surface 14 to be measured. The optical test surface 14 is therefore measured in overlapping sections by displacing the interferometer unit 24. For this purpose the interferometer unit 24 comprises a displacement device which allows the interferometer unit 24 to be displaced in the x-y plane, as indicated by the arrows 25. The measurement results of the surface sections measured are then combined by calculation. Alternatively, the interferometer unit 24 can also be designed as a full-surface measuring interferometer. In this case the cross-section of the measuring beam 30 is large enough to cover the whole optical test surface 14. Whereas the subaperture-measuring stitching interferometer enables greater local resolution, the design as a full-surface measuring interferometer enables one to average artefacts which are introduced by the optics of the interferometer unit 24 and to reduce the required measuring time.

The accuracy of the shape of the optical test surface 14 determined by the interferometric measurement described above is, however, limited by the accuracy of the adaptation optics which, in the present example, are formed by the diffractive optical element 20. In other words, errors in the adaptation optics, i.e. inaccuracies in the wavefront adaptation, are included in the interferometric measurement result.

The measure described below makes it possible to remove adaptation optics errors from the interferometric measurement result.

Figure 2:
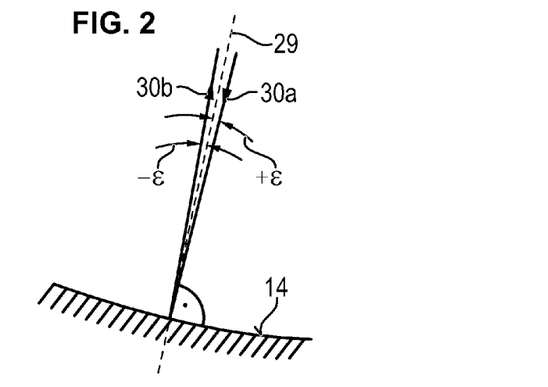

According to the above mentioned measure the adjustable deflection mirror 32 is arranged in different consecutive tilt positions so that the angle of incidence ε of the incoming measuring beam 30a illustrated in FIG. 2 is varied two-dimensionally. For this purpose the adjustable deflection mirror 32 is tilted both relative to the y axis and relative to the x axis. FIG. 1 shows as an example, by means of a double arrow, a tilting movement 34 relative to the y axis.

If the adjustable deflection mirror 32 is tilted such that the incoming measuring beam 30a is tilted by the angle ε with respect to the perpendicular 29 to the optical test surface 14, the returning measuring beam 30b generated by reflection on the optical test surface 14 is tilted by the angle −ε in relation to the perpendicular 29. This leads to the returning measuring beam 30b being offset laterally as it passes through the Fizeau plate 22 and the diffractive optical element 20. In detail, the lateral offset on the upper side of the Fizeau plate 22, which is designated as the optical surface 54-1, is $\Delta x_1$, on the lower side of the Fizeau plate 22 forming the reference surface 42, which is designated as the optical surface 54-2, $\Delta x_2$, on the upper side of the diffractive optical element 20, which is designated as the optical surface 54-3, $\Delta x_3$, and on the lower side of the diffractive optical element 20, which is designated as the optical surface 54-4, $\Delta x_4$. In other words, lateral shearing of the individual contributions to the overall wavefront originating from the individual optical surfaces occurs. The adjustable splitter mirror 36 is adapted by a corresponding tilting movement 38 to the changed direction of the returning measuring beam 30b.

Figure 5:
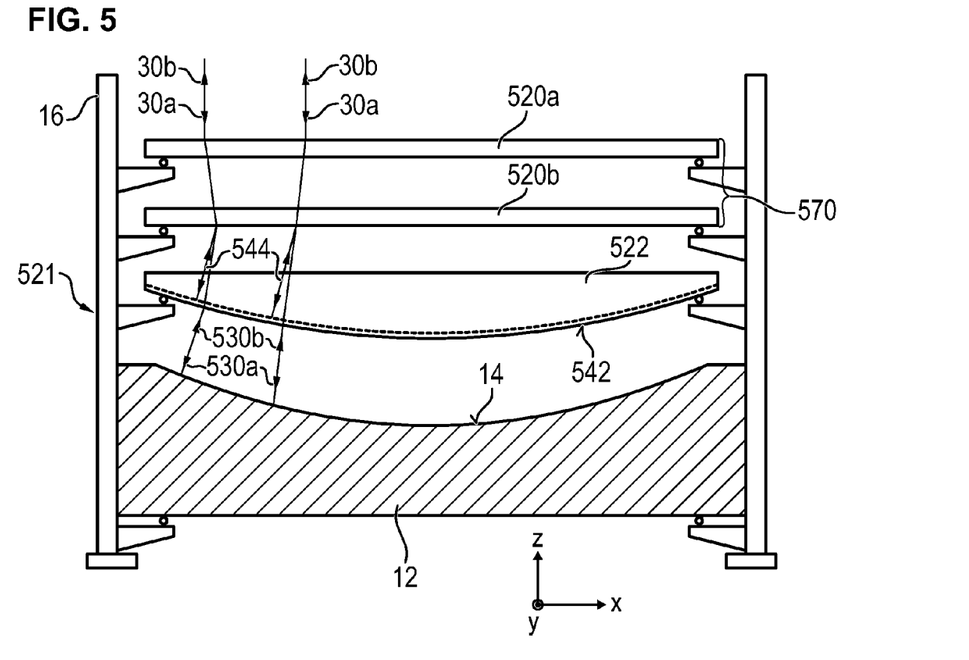
Figure 6:
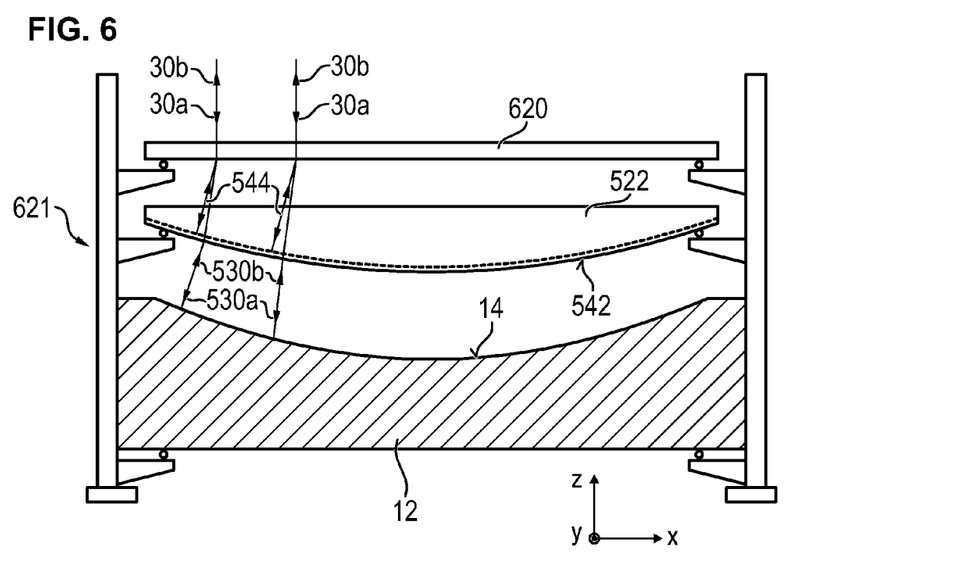

For the individual tilt positions ε in the x and y direction the respective wavefront $W_\epsilon(x_k, y_k)$ measured on the camera 52 is recorded as a function of the camera pixels $x_k$ and $y_k$. The wavefront $W_\epsilon(x_k, y_k)$ is composed of the individual wavefront contributions of all of the optical surfaces i outside of the interferometer unit 24 while passing in and returning. In the exemplary embodiment according to FIG. 1 the surfaces i comprise the surfaces 54-1, 54-2, 54-3, 54-4 and the optical test surface 14. The following applies:

$$W_\varepsilon(x_k, y_k) = \sum_{i=1}^{N} [W_{\varepsilon,i}(x_i, y_i) - W'_{\varepsilon,i}(x'_i, y'_i)], \quad (1)$$

with $W_{\epsilon,i}(x_i, y_i)$ as the individual contribution of the surface i when passing to the break-through points $x_i$, $y_i$, and $W'_{\epsilon,i}(x'_i, y'_i)$ as the individual contribution of the surface i when returning to the break-through points $x'_i$, $y'_i$. N is the number of surfaces i outside of the interferometer unit 24. Equation (1) can be applied correspondingly to the embodiments shown in FIG. 5 and FIG. 6 and described subsequently. The individual wavefront contributions of all surfaces in the respective cavity unit, at which a lateral shearing of the measurement beam occurs when changing the angle of incidence ε, can be analysed.

A series of wavefronts $W_\epsilon(x_k, y_k)$ with different angles of incidence ε varied in the x and y direction are recorded by evaluating the respective interference patterns detected by means of the camera 52. The individual contributions $W_i(x_i, y_i)$ of the optical surfaces i for ε=0 are then determined iteratively from the wavefronts $W_\epsilon(x_k, y_k)$ recorded by the evaluation device 26. This can be implemented with different algorithms.

According to a first algorithm according to an embodiment of the invention individual rays of the measuring beam 30 are assigned to the individual measuring points on the detector camera 52, i.e. to the individual camera pixels $(x_k, y_k)$. The individual ray assigned to the respective camera pixel $(x_k, y_k)$ identifies the path of the radiation illuminating the corresponding camera pixel through the optical system comprising the optical surfaces i. Then, by means of ray tracing, simulated coordinates of break-through points of the individual rays in relation to the optical surfaces i are provided as a function of the angle of incidence ε. The ray tracing is implemented for a perfect optical system, i.e. for the interferometer unit 24 and the optical surfaces i in the desired state. Then, taking into account the coordinates of the break-through points, the effect $W_i(x_i, y_i)$ of the individual optical surfaces i upon the wavefront measurement result measured with ε=0 is determined iteratively. As a result of the iteration it is then assumed that the break-through points do not change when the individual contributions $W_i(x_i, y_i)$ are varied.

According to a further embodiment of an algorithm according to the invention the wavefront $W_\epsilon(x_k, y_k)$ is simulated as a function of the angle of incidence ε by ray tracing. The contributions $W_i(x_i, y_i)$ of the optical surfaces i taken into account during the simulation are varied here. By comparing the simulation results with the wavefronts $W_\epsilon(x_k, y_k)$ measured, the contributions $W_i(x_i, y_i)$ of the optical surfaces i are determined. In other words, according to this algorithm the iteration of the surface contributions $W_i(x_i, y_i)$ is implemented directly using a ray tracing programme. The surface contributions are then varied point by point with interpolation, e.g. by means of splines, until the simulations correspond to the measured results.

Finally, the shape of the optical test surface 14 calculated upon the basis of the wavefront measured with ε=0 is corrected by removing the individual contributions $W_i(x_i, y_i)$ not originating from the optical test surface 14.

The apparatus 10 shown in FIG. 1 according to a design variation is configured as described in the following. It is designed to measure free form surfaces deviating form its best fitting sphere by less than or equal to 5 mm. Typical sizes of the diffractive optical element 20 include 4, 6, 9 and 12 inches. The diameter of the subaperture to be measured in one single measurement subaperture is in the range between 25 mm and 250 mm. A number of 4 to 1000 subaperture measurements may be stitched together. The angle of incidence ε may vary from 0.5° to 5°. The lateral shearing of the measurement beam at the individual elements resulting from the tilting may be between 2% and 20% of the diameter of the respective element.

FIG. 3 shows a further embodiment according to the invention of an apparatus 10 for determining a shape of the optical test surface 14 of the optical element 12. The apparatus 10 according to FIG. 3 comprises the cavity unit 21 of the embodiment according to FIG. 1 and an interferometer unit 324.

The interferometer unit 324 comprises a radiation source 27 and a wave guide 28 of the type described with reference to FIG. 1, which together form a measuring beam generation device. Measuring radiation exits from the end of the wave guide 28 in form of a divergent measuring beam 30. The location, at which the measuring beam 30 exits the wave guide 28 is referred to as outlet opening 56. The measuring beam 30 is deflected by a deflection mirror in form of a splitter mirror 364 into the direction of the cavity unit 21, passes through a refractive collimator 366 and subsequently strikes the Fizeau plate 22 as the so-called incoming measuring beam 30a. The refractive collimator may comprise one or several lenses.

The angle of incidence ϵ of the incoming measuring beam 30a, as illustrated in FIG. 2, is varied in the embodiment according to FIG. 3 by translating the end of the waveguide 28 containing the outlet opening 56 laterally with respect to the propagation direction of the measuring beam 30 exiting the outlet opening 56, i.e. in the y-z-plane of the coordinate system of FIG. 3. The translation movement of the end of the waveguide 28 is indicated in FIG. 3 by a double arrow 362 and is performed by a translation device. The movement 362 is performed such that the measuring beam 30 exiting the outlet opening 56 is shifted laterally with respect of its propagation direction. This shift results in a tilt of the incoming measuring measuring beam 30a with respect to the Fizeau plate 22.

The returning measuring beam 30b exiting the cavity unit 21 after reflection of the incoming measuring beam 30a at the optical test surface 14 passes together with the reference beam 44 through the collimator 366 in reverse and subsequently through the splitter mirror 364 to enter a detection arm of the interferometer unit 324. The detection arm of the interferometer unit 324 corresponds to the detection arm of the interferometer unit 24 described with respect to FIG. 1 above and comprises an aperture 48, a refractive ocular 50 and a camera 52, to which an evaluation device 26 is attached. The refractive ocular 50 may comprise one or several lenses. The evaluation of the signal detected by the camera 52 is performed as described above with respect to the embodiment of FIG. 1.

In a variation of the embodiment of the interferometer unit 324 according to FIG. 3, the laterally translatable wave guide 28 is replaced by several radiation sources, arranged laterally displaced to each other. The different angles of incidence ϵ are obtained by switching corresponding radiation sources on and off.

FIG. 4 shows a further embodiment according to the invention of an apparatus 10 for determining a shape of the optical test surface 14 of the optical element 12. The apparatus according to FIG. 4 differs from the apparatus according to FIG. 3 in only the configuration of the interferometer unit. The interferometer unit according to FIG. 4, designated by the reference numeral 424, differs from the interferometer unit 324 according to FIG. 3 in that the refractive collimator 366 and the refractive ocular 50 are both replaced by reflective elements, namely by parabolic mirrors 466 and 450, respectively.

While the interferometer 324 due to the refractive nature of the collimator 366 and the ocular 50 may be referred to as a refractive telescope, the interferometer 324 may be referred to as mirror telescope. Advantages of the mirror telescope comprise the absence of interfering reflexions as well as a minimization of the number of optical surfaces involved, as the parabolic mirrors 466 and 450 may be configured by only one mirror each. This way the analysis of error contributions of the individual optical surfaces to the measurement result is facilitated.

FIG. 5 shows a further embodiment 521 of a cavity unit which can be used in any of the apparatuses 10 shown in FIGS. 1, 3 and 4 instead of the cavity unit 21 shown therein. The cavity unit 521 differs from the cavity unit 21 in that it comprises a double diffractive element system 70 instead of the single diffractive element 20 of cavity unit 21. The diffractive element system 70 comprises two diffractive elements 520a and 520b in form of computer generated holograms (CGHs) arranged consecutively in the beam path of the incoming measuring beam 30a, such that the incoming measuring beam first passes through the first diffractive element 520 and subsequently through the second diffractive element 520b. The cavity unit 521 further differs from the cavity unit 21 in that it comprises a spherical Fizeau lens 522 instead of a Fizeau plate 22. The Fizeau lens 522 is arranged here after the diffractive elements 520a and 520b in the beam path of the incoming measuring beam 30a.

The incoming measuring beam 30a passes through the diffractive element system 70 which serves as adaptation optics and is configured to generate in plus first diffraction order an incoming object beam 530a, the wavefront of which is adapted to the desired shape of the optical test surface 14. The element system 70 is further configured to generate in minus first diffraction order a reference beam 544 which has a spherical wavefront. The reference beam 544 strikes a spherical reference surface 542 of the Fizeau lens 522 perpendicularly, such that it is reflected into itself and subsequently passes through the element system 70 in reverse direction and enters the interferometer unit.

The incoming object beam 530a passes through the spherical Fizeau lens 522 strikes the test surface 14 of the optical element 12 perpendicularly in case the angle of incidence ϵ is adjusted to be 0° by the interferometer unit, as is the case in the beam path displayed in FIG. 5. The incoming object beam 530a is reflected at the test surface 14 into itself and passes as returning object beam 530b in reverse direction through the Fizeau lens 522 and the diffractive element system 570 and enters the interferometer unit as returning measuring beam 30b.

With the above described measurement algorithm the individual wavefront contributions $W_{\epsilon,i}(x_i, y_i)$ of each of the two diffractive optical elements 520a and 520b of the diffractive element system 570 can be determined. Referring to equation (1) N ist the number of surfaces in the cavity unit 521 at which a lateral shearing of the measurement beam, including beam 30a and the object beam 530a, occurs when changing the angle of incidence ϵ.

FIG. 6 shows another embodiment 621 of a cavity unit which can be used instead of the cavity unit 521 according to FIG. 5. The cavity unit 621 differs from the cavity unit 521 in that a single diffractive optical element 620 is used instead of the double diffractive element system 570. The diffractive optical element 620 is double coded in the form of a double coded CGH, also referred to as complexly coded CGH. Such a double coded diffractive optical element 620 comprises two diffractive structures arranged on the same surface. The first diffraction order of the first diffractive structure generates the spherical reference beam 544 and the first diffraction order of the second diffractive structure generates the incoming object beam 530a having a wavefront adapted to the desired shape of the optical test surface 14.

In the cavity unit 521 and 621 the reference surface 542 and the test surface 14 of the optical element 12 are arranged directly opposite to each other and therefore form a relatively small cavity. Therefore the measurement is very insensitive towards vibration and air turbulences. The cavity unit can be calibrated by replacing the optical element 12 by a calibration element having a spherical surface using calibration procedures known to the skilled person, like the so called three position test and rotation-shift techniques. The Fizeau lens 522 itself can be rotated in the measurement process in order to reduce residual errors caused by the Fizeau lens 522.

The invention claimed is:
1. A method of determining a shape of an optical test surface comprising:
with adaptation optics, adapting a wavefront of a measuring beam to a desired shape of the optical test surface and interferometrically measuring the shape of the optical test surface using the adapted measuring beam, irradiating the adapted measuring beam at different angles of incidence onto the optical test surface, and measuring respective wavefronts of the measuring beam after the measuring beam interacts with the optical test surface, to provide interferometric measurement results, establishing an effect of the adaptation optics upon the interferometric measurement results from the wavefronts measured for the different angles of incidence, and determining an actual shape of the optical test surface by removing the established effect of the adaptation optics from the interferometric measurement results.

2. The method according to claim 1, further comprising:

with an optical branch-off device, branching off a reference beam from the measuring beam, establishing an effect of the branch-off device upon the interferometric measurement results from the wavefronts measured for the different angles of incidence, and, while determining the actual shape of the optical test surface, removing the established effect of the branch-off device from the interferometric measurement results.

3. The method according to claim 1, wherein the measuring of the respective wavefronts of the measuring beam is implemented by evaluating interference patterns recorded with a detector camera, individual rays of the measuring beam being assigned to individual measuring points on the detector camera, and further comprising, with ray tracing, providing simulated coordinates of break-through points of the individual rays in relation to at least one optical surface of the adaptation optics as a function of the angles of incidence, and wherein while establishing the effect of the adaptation optics upon the interferometric measurement results, the coordinates of the break-through points are taken into account.

4. The method according to claim 1, wherein the respective wavefronts are simulated as a function of the angles of incidence by ray tracing, whereby a contribution of at least one optical surface of the adaptation optics to the wavefront taken into account during the simulation is varied, and further comprising, by comparing the simulation results with the measured wavefronts, determining the contribution of the at least one optical surface, and using the determined contribution when establishing the effect of the adaptation optics upon the interferometric measurement results.

5. The method according to claim 1, wherein the desired shape of the optical test surface is a free-form surface.

6. The method according to claim 1, wherein, upon irradiating the adapted measuring beam, the angle of incidence on the optical test surface is varied two-dimensionally.

7. The method according to claim 1, wherein the optical test surface is formed by an optical element for microlithography.

8. The method according to claim 7, wherein the optical element is configured as a mirror for extreme-ultraviolet microlithography.

9. The method according to claim 1, wherein the adaptation optics comprise a diffractive optical element.

10. An apparatus for determining a shape of an optical test surface comprising:

adaptation optics for adapting a wavefront of a measuring beam to a desired shape of the optical test surface, the apparatus being configured to measure the shape of the optical test surface interferometrically, an angle of incidence varying device for irradiating the adapted measuring beam at different angles of incidence onto the optical test surface, and an evaluation device which is configured to establish an effect of the adaptation optics upon the interferometric measurement results from respective wavefronts of the measuring beam measured for different angles of incidence after the measuring beam interacts with the optical test surface, and to determine an actual shape of the optical test surface by removing the established effect of the adaptation optics from the interferometric measurement results.

11. The apparatus according to claim 10, wherein the angle of incidence varying device comprises an adjustable deflection mirror.

* * * * *